Patented Mar. 11, 1947

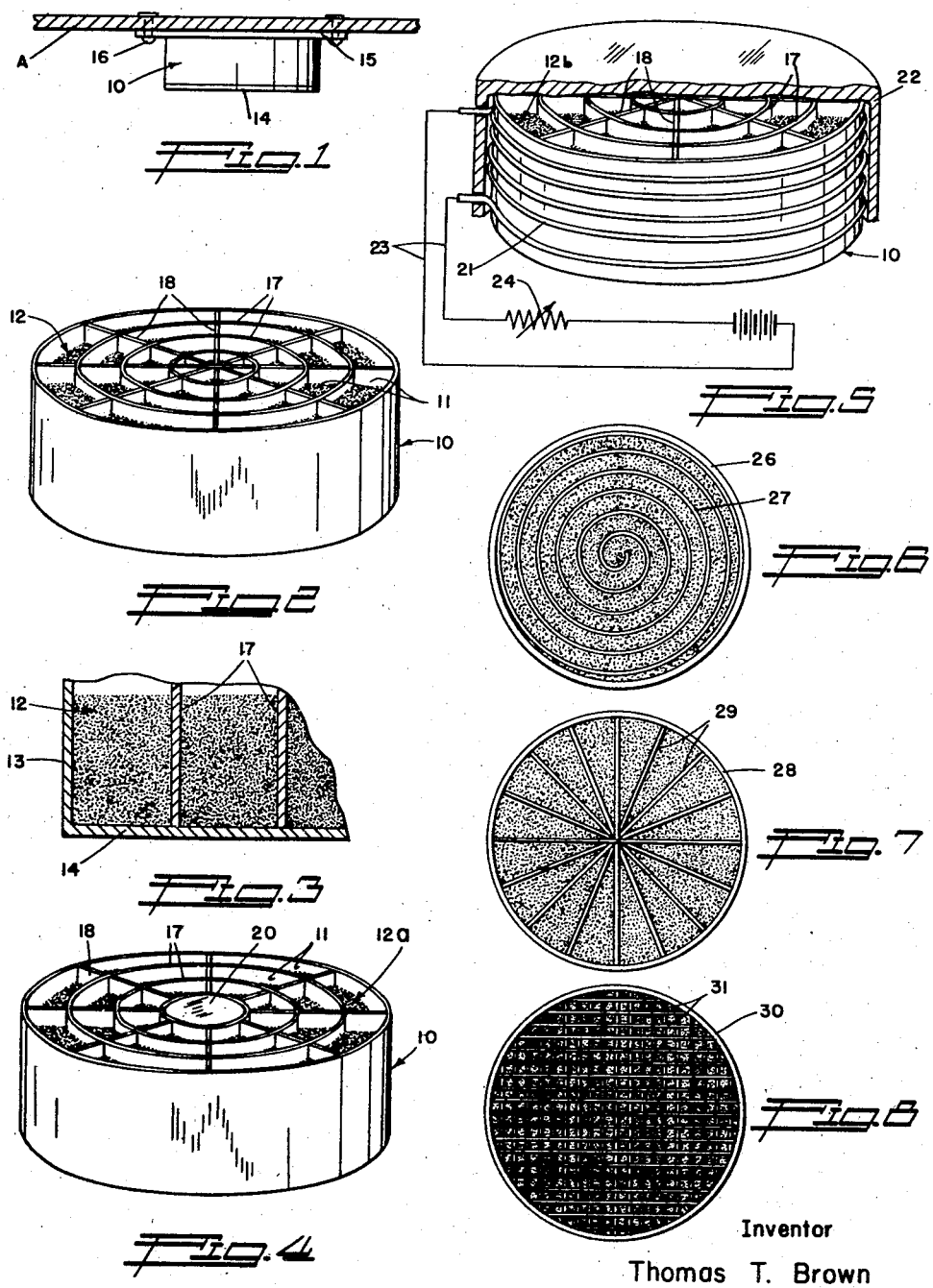

2,417,347

UNITED STATES PATENT OFFICE 2,417,347

VIBRATION DAMPER

Thomas T. Brown, Laguna Beach, Calif., assignor, by mesne assignments, to Lockheed Aircraft Corporation, a corporation of California Application July 6, 1943, Serial No. 493,647

11 Claims. (Cl. 188—1)

This invention relates to apparatus for damping vibration and it is a general object of the invention to provide a simple, inexpensive and efficient vibration dampening apparatus.

The present invention is concerned primarily with the control and dampening of vibration and the apparatus of the invention is capable of employment in practically all situations where the damping or partial damping of vibration is necessary or desirable. The invention is well suited for use in aircraft where vibration and vibration effects are serious problems, but this is merely one example of a practical application of the invention. Reference will be made to the employment of the apparatus in aircraft, it being understood that such reference is not to be considered as in any way limiting the range of utility of the invention.

Another object of the invention is to provide a small, compact unit that is highly effective in the absorption and damping of vibration.

Another object of the invention is to provide a vibration damper operable to offer a high degree of resistance to vibratory motion throughout a wide range of frequencies. The invention may be embodied in a damping device intended for use where a given frequency of vibration or a given range of frequency is to be encountered and may be embodied in forms for damping vibration throughout a very wide range of frequencies.

Another object of the invention is to provide a vibration damping device that converts the vibratory motion into readily dissipated heat by dry friction between particles of a massive powder, by the friction between granules or metallic shot, or by the mass and viscosity of a liquid and does not depend upon spring action, hydraulic action or the simple shifting of a mass. In the apparatus of the invention the vibration is damped by a massive powder, granular mass or shot mass, or by a viscous liquid or a combination of these damping materials which serves to convert the kinetic energy into heat without the necessity of employing mechanical means such as springs, cylinders and pistons or the like.

Another object of this invention is to provide a vibration damper of the character referred to in which the massive powder, granular mass or liquid is contained in rough-walled compartments so that the vibratory motion is resisted and absorbed by the frictional contact of the particles, granules or liquid with the compartment walls.

Another object of the invention is to provide a vibration damper of the character referred to in which the resistance to vibratory motion is increased by magnetic or electromagnetic resistance to powder particle movement. In certain embodiments of the invention the vibratory motion is resisted by the frictional contact between the powder particles or in other words, by coulomb damping, and the vibratory motion is also resisted by the tendency of the powder particles to resist all change in their magnetic alignment. In the magnetic types of the damper of the invention, current is induced in the powder or across the liquid mass and/or within the walls of the compartments through movement relative to a magnetic field. This current encounters an electrical resistance which converts the kinetic energy of the vibration into heat, supplementing the coulomb vibration absorbing action or the viscosity and mass of the liquid.

Another object of the invention is to provide a vibration damper in which the vibration damping effect may be varied at will as circumstances may require. The invention may embody an electromagnetic means for inducing a vibration absorbing or resisting current in the massive material or liquid and a variable resistance in the circuit of the electromagnetc means for varying the action of the electromagnet.

Other objects and features of the invention will be readily understood from the following detailed description of typical preferred forms of the invention, throughout which description reference is had to the accompanying drawings in which:

Figure 1 is a side elevation of a damper of the invention secured to a member subject to vibration.

Figure 2 is an enlarged perspective view of the device of Figure 1 with one end removed to illustrate the interior of the container.

Figure 3 is an enlarged fragmentary sectional view of the damper of Figures 1 and 2.

Figures 4 and 5 are views similar to Figure 2 illustrating other forms of the invention.

Figures 6, 7 and 8 are plan views of containers with the upper ends removed illustrating other forms of compartments.

The embodiment of the invention illustrated in Figures 1, 2 and 3, may be said to comprise generally a container 10 having compartments 11 and vibration absorbing material 12 in the compartments.

The container 10 may be of any selected or required shape and construction and its proportions depend upon the particular application of the invention. As illustrated in the drawings, the container 10 is a hollow cylindrical structure having a cylindrical side wall 13, a bottom wall 14 and a top 15. The walls 13, 14 and 15 are imperforate, and joined and sealed together to form a closed container. The internal surfaces of the walls 13, 14 and 15 are rough, that is, they are not finished smooth, and these surfaces offer substantial frictional resistance to movement of the powder particles, granules or liquid as the case may be. The container 10 may have means to facilitate its attachment to the element or member A, which is subject to vibration. In the simple case illustrated the container top 15 is extended beyond the wall 13 to constitute a flange. Screws, bolts or the like 16, are arranged through openings in this flange to secure the damper to the member A.

Where low frequency vibrations are encountered, the container 10 may be designed to contain a single mass of vibration damping material such as metallic shot or metallic granules or may be divided into a limited number of relatively large compartments for containing such coarse or relatively coarse vibration absorbing material. However, where higher frequencies are encountered, the container 10 is partitioned into smaller compartments 11 for containing a massive powder, damping material of relatively fine mesh or a viscous fluid. In Figures 2 and 3 there are spaced tubular or circular walls 17 provided within the container 10 in concentric relation to its cylindrical side wall 13. Spaced radial walls 18 extend between the adjacent circular walls 17 and between the outermost circular wall 17 and the side wall 13 of the container. The radial partitions or walls 18 within the innermost circular wall 17 converge and join at the longitudinal axis of the container 10. The partitions or walls 17 and 18 are preferably rigidly joined or interlocked. The walls 17 and 18 extend between the upper and lower ends or walls 14 and 15 of the container 10 and are connected or closely engaged therewith. The compartments 11 defined by the walls 17 and 18 and the internal surfaces of the container 10 are all distinct and entirely sealed so that the vibration absorbing material cannot pass from one compartment to another.

The nature of the vibration absorbing material may vary in the different applications of the invention. Where low frequency vibrations are to be encountered, the material 12 may be made up of relatively large particles or units such as shot and may be contained in relatively large compartments or in a single large compartment. Where higher frequencies are to be encountered, the material 12 may constitute granular metal or fine powder and the compartments 11 may have smaller proportions. Where the device is employed to dampen a broad range of vibration frequencies, or where objectionable high harmonics are present, the mass of material 12 may be made up of mixtures of particles of different sizes The general relation between the frequency ranges and the material unit or particle size is shown in the following table which is subject to variation to adapt the device for given applications.

Frequency range 5 to 20 C. P. S.—metallic shot.
Frequency range 20 to 100 C. P. S.—granulated metal.
Frequency range 100 to 1000 C. P. S.—fine powder, 200 mesh or finer.

In the form of the invention illustrated in Figures 1, 2 and 3, the material 12 may be any material whose mass and inter-particle friction provides for the desired vibration damping action. I have found that lead and lead oxide in the form of shot, granules or powder as the case may be, are very effective as damping materials, it being understood that other massive materials may be employed. It is preferred, although not essential, that the shot, granules or powder particles present rough surfaces so that the material has a high coefficient of friction. The relation between the capacity of the compartments 11 and the volume of the material 12 in the individual compartments varies in different applications of the invention. Where low or relatively low frequencies of vibration are to be damped, the material 12 should not occupy more than about 90% of the individual compartments 11, but where high frequencies are encountered, the compartments may be almost entirely occupied by the material 12. It is to be understood that in the invention as thus far described, the material 12 is dry and its particles, granules or shot are free and loose to be subject to individual movement.

The invention contemplates the use of a suitable liquid as the vibration damping medium or material. The damping liquid should combine the characteristics of great mass and high viscosity. Mercury has these characteristics and is effective as a vibration damping material. Heavy oils and other liquids of relatively low density may be employed but are not as effective as mercury. It is further contemplated that the vibration absorbing material may be a combination or mixture of a selected liquid and solid matter. Examples of such combinations are mercury and lead amalgamated, and a suitable oil and water emulsion with granulated lead. In all cases where a liquid is employed it is preferred that a sealed individual body of the liquid or liquid and solid matter mixture as the case may be, is contained in an individual compartment or that sealed bodies of the liquid or the mixture occupy individual compartments 11.

In the use or application of the form of the invention described above one or more of the dampers are secured to the part or parts subject to the vibration. In the case of aircraft, the dampers are applied to the parts or components subjected to the various vibration effects. By a judicious use of the dampers, the vibration of the various frequencies can be damped out. The dampers may be secured to any element such as the skin, an internal part, structural member, instrument, appliance or projecting or suspended member where vibration is undesirable, hazardous or annoying, or is liable to cause flutter, material fatigue, etc. Where the damper embodies a dry damping material, the resistance to vibratory motion is principally coulomb damping, that is, the dry friction between the powder particles, granules or shot as the case may be, and the friction between the particles, granules or shot with the walls of the compartments 11. This damping action is particularly effective because of the mass of the particles and their coefficient of friction. The kinetic energy impressed on the particles, granules or shot is rapidly and continuously converted into heat by the interparticle friction and the frictional contact with the rough walls of the compartments 11 and this heat is dissipated as rapidly as it is generated. In larger applications of the invention it may be desirable to provide fins or other heat dissipating means for the container 10. Where the damping material is liquid the viscosity of the liquid and its mass serve to resist and absorb the vibratory motion, converting the kinetic energy into readily dissipated heat. The vibration dampers of the invention remain effective indefinitely and require no servicing or reconditioning. There are no parts subject to wear and no parts that require adjustment.

Figure 4 illustrates an embodiment of the invention in which the dry, frictional damping action or the liquid viscosity and mass damping action described above is supplemented by an electromagnetic resistance damping action. The case or container 10 and the compartments 11 may be the same as described above except that there are no radial walls 18 within the innermost circular wall 17 and it is preferred to construct the container 10 and the various partitions of non-magnetic material. In this embodiment where dry material 12a is employed, it is paramagnetic. For example, it is iron, steel or nickel. Such paramagnetic materials are massive and are readily provided in particle or powdered form as required, and have the required inter-particle friction, magnetic permeability and electrical conductivity. In some instances the material 12a may be a selected non-magnetic material such as aluminum. The size of the particles may be varied to adapt the device for the damping of the vibrations or range of vibrations to be encountered in the particular installation and the volumes of the masses 12a, and the aggregate of the masses 12a may be determined to adapt the device for a given application. A selected liquid, preferably mercury, may be used instead of the dry material 12a as in the other forms of the invention.

The embodiment illustrated in Figure 4 is characterized by a permanent magnet 20 for maintaining a magnetic field within the bodies of material 12a, and the walls 13, 14, 15, 17 and 18 of the container. In the particular case illustrated, the magnet 20 is in the form of a cylindrical rod housed within the innermost circular wall 17 to be co-axial with the container. The magnet 20 is of sufficient strength magnetically to set up a field throughout the entire series of material masses 12a. The action or operation of the damper illustrated in Figure 4 will be described later in connection with the structure of Figure 5.

Figure 5 illustrates a form of the invention in which a paramagnetic damping material is provided in the compartments 11 and an electromagnetic means is used instead of the permanent magnet 20 of Figure 4. The container 10 and the compartments 11 may be substantially the same as in Figures 1 to 4 inclusive, or may be of any other selected shape and construction. The paramagnetic material 12b may be granular or powdered to any given mesh as the conditions of use require, or mercury or other selected liquid may be used if desired. The electromagnet may be in the form of a simple coil 21 arranged in surrounding relation to the side wall 13 of the container 10. In this construction, the container 10 may be enclosed by a shell 22 and the windings of the coil 21 are suitably protected. The coil 21 is supplied with current by leads 23 extending from any available or selected electrical source. In accordance with the invention a variable resistance 24 is interposed in the circuit of the coil 21 so that the vibration absorbing action of the damper may be controlled or varied as conditions may require.

In the use or operation of the devices shown in Figures 4 and 5, the containers are secured to the parts which are subjected to vibration and the dampers may be proportioned and positioned to obtain the necessary vibration absorbing action. Where the dry material 12a or 12b is employed, the highly effective dry friction damping action serves to absorb the vibration and convert the kinetic vibratory energy into heat and where a liquid damping medium is employed, its mass and viscosity serve to dampen out the vibration, these actions being the same as described above in connection with the embodiment of Figures 1, 2 and 3. In addition to the dry inter-particle friction, or the mass or viscosity damping, there is a damping of the vibration by electrical resistance. The magnet 20, or electromagnetic coil 21 as the case may be, establishes a magnetic field in the container 10 throughout the material 12a or 12b and through the container and compartment walls. The fixed magnetic field produces the well-known magnetic alignment of the particles of the material 12a or 12b. The vibratory motion tends to disturb this alignment of the magnetic poles and the alignment is continuously being changed or altered. The vibratory kinetic energy is absorbed in this action and transformed into readily dissipated heat. More specifically, current is electromagnetically induced within the material 12a or 12b or across the body of liquid or within the partition walls through movement with respect to the fixed magnetic field. This induced current encounters resistance which converts the kinetic energy of the vibration into heat. Thus in the case of Figures 4 and 5, there is the absorption of the vibration by the inter-particle friction and by the electromagnetic resistance action just described. Where the device of Figure 5 is employed the electromagnetic vibration absorbing action or capacity may be varied at will to meet the particular conditions of operation.

Figures 6, 7 and 8 illustrate typical alternative forms of compartmentation that may be employed in the dampers of the invention. In Figure 6 there is a cylindrical container wall 26 and a helical partition 27 within the wall. The partition 27 arranged within the wall 26 provides a single helical compartment whose width or cross section gradually increases from the center of the damper outwardly to the wall 26. In Figure 7 there is a cylindrical outer wall 28 and a multiplicity of partitions 29 radiating from the central longitudinal axis of the wall 28. The partitions 29 within the wall 28 define a multiplicity of segmental compartments for the material 12, 12a or 12b. In Figure 8 there is an outer wall 30 of any selected configuration and multiplicities of internal partitions 31 arranged in right angled or perpendicular relation to provide a plurality of rectangular compartments. It is to be understood that in the several compartment structures the compartments may be of the required or selected capacity and number, and that the enclosing case or container 10 may be of any required dimensions.

Having described only typical forms of the invention I do not wish to be limited to the specific details herein set forth, but wish to reserve to myself any variations or modifications that may appear to those skilled in the art or fall within the scope of the following claims.

I claim:

1. A device for damping vibration of a relatively stationary object subject to vibration comprising, a container, means for rigidly securing the container to said object, partitions dividing the interior of the container into a plurality of compartments to thereby increase the wall area within the container, and free bodies of divided massive material loosely contained in the compartments so that their particles are free for relative movement to have interparticle friction for converting vibratory motion into heat, the surfaces of the partitions being rough to offer additional frictional resistance to movement of the particles of the material.

2. In combination, a stationary object subject to vibration, and means for damping such vibration comprising a closed container fixed to the object, partitions in the container dividing the interior thereof into a plurality of compartments to thereby increase the wall area within the container, and free bodies of massive material loosely contained in the compartments so that their particles are free for relative movement to have interparticle friction, the internal surface of the container and the surfaces of the partitions being rough to offer additional frictional resistance to movement of said material in the compartments.

3. In combination, a relatively stationary member subject to vibration, and means for damping such vibration of the member comprising a container having one or more compartments, means for securing the container to the member, bodies of particles of paramagnetic material loosely contained in the compartments so as to have interparticle friction which converts vibratory motion into heat, and means for establishing a magnetic field in said material to align the magnetic poles of the particles so that vibratory motion tending to disturb such alignment is absorbed and converted into heat.

4. In a structure subjected to vibration, a relatively stationary member subjected to such vibration, and means for damping vibration of the member including a container having a plurality of compartments, means for securing the container to the member, bodies of particles of massive material loosely contained in the compartments so that the particles are free for relative movement to dampen vibration by friction between the particles, electromagnetic means for establishing a magnetic field in said material to align the magnetic poles of the particles so that vibratory motion tending to disturb such alignment is absorbed and converted into heat, an energizing circuit for the electromagnetic means, and a variable resistance in said circuit operable to vary the strength of the magnetic field and thus regulate the vibration damping action.

5. In a structure subjected to vibration, a relatively stationary member subjected to such vibration, and means for damping vibration of the member including a container having a plurality of compartments, means for securing the container to the member, free bodies of particles of high density material loosely contained in the compartments so that the particles are free for relative movement to dampen vibration by friction between the particles, and means for maintaining a magnetic field in said bodies for aligning the magnetic poles of the particles of said bodies so that vibratory motion tending to disturb such alignment of the poles is absorbed and converted into heat.

6. In a structure subjected to vibration, a relatively stationary member subjected to such vibration, and means for damping vibration of the member including a container having a side wall and a plurality of compartments, means for securing the container to said member, bodies of divided paramagnetic material loosely contained in the compartments operable to convert the kinetic energy of vibratory motion into heat through coulomb damping action, and an electromagnetic coil around said wall for establishing a magnetic field in said material which aligns the magnetic poles of the particles of divided material so that vibratory motion tending to disturb such alignment is absorbed and converted into heat.

7. A device for damping vibration of a relatively stationary member subject to vibration comprising a container, means for securing the container to the member to be stationary therewith and to be subject to said vibration, a mass of massive paramagnetic material in particle form loosely contained in the container so as to have freedom of relative movement between its particles, and means for maintaining a magnetic field in said mass of material so that said mass of material converts the kinetic energy of vibration into heat through a coulomb damping action and electromagnetically induced electrical resistance in the mass.

8. A device for damping vibration of an object subject to vibration comprising a container having a compartment presenting a rough wall, means for securing the container to said object, a free mass of material loosely contained in the compartment so as to have interparticle friction and frictional engagement with said wall when said object is subject to vibration to dampen the vibration by the interparticle friction and engagement with said wall, and means operable to create a magnetic field in said mass to magnetically align the poles of the particles of said mass so that vibratory motion tending to disturb such alignment is absorbed and converted into heat.

9. A device for damping vibration of an object subject to vibration comprising a container having a compartment presenting a rough wall, means for securing the container to said object, a free mass of divided material in the form of particles loosely contained in the compartment so as to have freedom of relative movement between the particles and frictional engagement with said wall when said object is subject to vibration, and means operable to create a magnetic field in said mass to magnetically align the poles of the particles of said mass so that vibratory motion tending to disturb such alignment is absorbed and converted into heat, the last named means including an electromagnetic coil at the container, and means for energizing the coil.

10. A device for damping vibration of an object subject to vibration comprising a container having a compartment presenting a rough wall, means for securing the container to said object, a free mass of divided material loosely contained in the compartment to have frictional engagement with said wall and interparticle friction when said object is subject to vibration, and means for creating a magnetic field in said mass to magnetically align the poles of the particles of said mass so that vibratory motion tending to disturb such alignment is absorbed and converted into heat, the last named means comprising an electromagnetic coil on the container, an energizing circuit for the coil, and a variable resistance in the circuit for varying the intensity of said field and thus vary the vibration absorbing action.

11. In a structure subject to vibration, the combination of an object subjected to the vibration, a container having one or more compartments, means for securing the container to the object, massive material in divided form loosely contained in the compartments to have inter-particle friction when subjected to vibration, and a permanent magnet associated with the container for maintaining a magnetic field in said material to resist change in the magnetic alignment of the particles and thus resist vibratory motion.

THOMAS T. BROWN.

REFERENCES CITED

The following references are of record in the file of this patent:

UNITED STATES PATENTS

| Number | Name | Date |
|---|---|---|
| 123,999 | King | Feb. 27, 1872 |
| 2,100,833 | Bruchel et al. | Nov. 30, 1937 |
| 2,295,829 | Carlson | Sept. 15, 1942 |
| 2,319,735 | Hussman | May 18, 1943 |
| 2,302,670 | Buchanan | Nov. 24, 1942 |
| 1,142,034 | Gerding | June 8, 1915 |
| 432,022 | DeCastro | July 15, 1890 |
| 1,831,280 | Wright et al. | Nov. 10, 1931 |
| 1,222,257 | Auth | Apr. 10, 1917 |
| 1,902,787 | Duesenberg | Mar. 21, 1933 |
| 2,180,539 | Miller | Nov. 21, 1939 |
| 2,277,111 | Johnson | Mar. 24, 1942 |

FOREIGN PATENTS

| Number | Country | Date |
|---|---|---|
| 532,467 | German | Aug. 28, 1931 |